Aug. 26, 1969  F. G. BACK  3,463,883
TELEVISION CAMERA LENS CONTROL DEVICE

Filed Aug. 15, 1966  5 Sheets-Sheet 1

INVENTOR.
FRANK G. BACK
ATTORNEY

INVENTOR.
FRANK G. BACK
BY Albert H Kronman
ATTORNEY

Aug. 26, 1969  F. G. BACK  3,463,883
TELEVISION CAMERA LENS CONTROL DEVICE
Filed Aug. 15, 1966  5 Sheets-Sheet 3

INVENTOR.
FRANK G. BACK
Albert Kronman
ATTORNEY

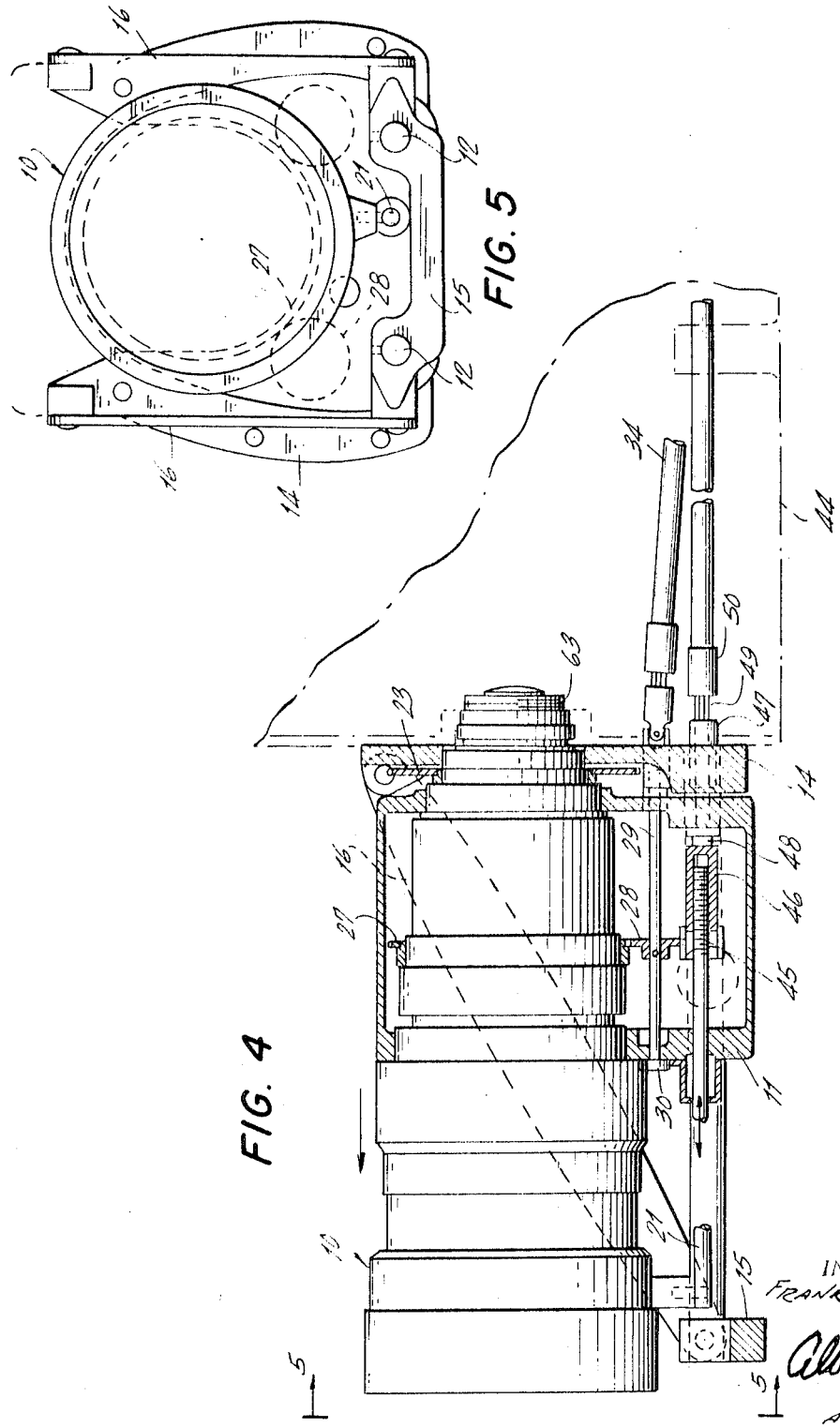

3,463,883
TELEVISION CAMERA LENS CONTROL DEVICE
Frank G. Back, Glen Cove, N.Y., assignor to Zoomar, Inc., Glen Cove, N.Y., a corporation of New York
Filed Aug. 15, 1966, Ser. No. 572,537
Int. Cl. H01j 29/89
U.S. Cl. 178—7.92
4 Claims

ABSTRACT OF THE DISCLOSURE

A television varifocal lens control device in which the lens is removably carried upon an upstanding plate secured to the camera having spaced forwardly extending rods thereon to support the lens. Positive rotary motion to focus, and drive the movable elements within the lens is supplied by two elongated telescoping rod-like systems in which non-circular inner members are driven by sleeves having non-circular bores to receive the inner members.

---

This invention relates to a mechanism for controlling the zoom and focus functions as well as the range of a varifocal lens as applied to television cameras.

Where varifocal or zoom lenses are used in conjunction with television cameras, it is important that the focusing and zooming operations be controlled with ease and precision. Since the standard television camera is massive in construction, the operator is forced to control the action of the lense from a position substantially removed from the lens itself. In addition, the control mechanism must be worked around the operating mechanism of the camera which intervenes between the lens and the control position. Prior art devices have sought to achieve this purpose by means of long flexible cables. However, flexible cables by the very nature of their structure fail to provide the positive control necessary for operating a zoom lens. Flexible cables are also subject to substantial frictional interference which further makes their operation undesirable from a control standpoint.

In many instances it is necessary to change the range of the zoom lens by interposing an extender between the exit end of the lens and the camera. In order to apply the extender, it was heretofore necessary to unscrew the zoom lens, apply the extender to the camera, and thereafter thread the zoom lens back into the extender. However, a zoom lens for a television camera has substantial weight and is extremely delicate. Where television cameras are used out of doors, and particularly at low temperatures, it is extremely awkward for operators to make the necessary adjustments and avoid damaging the lens. The extreme care necessary in prior art devices resulted in a time consuming operation which could not be tolerated in many installations such as sporting events. Some prior art devices require extensive uncoupling of the zoom and focusing control mechanism before the zoom lens can be removed for the purpose of inserting the extender.

Accordingly, it is an object of the present invention to provide a device for controlling the zoom and focus as well as the range of varifocal lens systems for television cameras.

Another object of the present invention is to provide a smooth operating, substantially frictionless drive for the focusing and zooming action of the lens.

Another object of the present invention is to provide a zoom lens mount for television cameras which will permit extenders to be inserted or removed with ease and in a minimum amount of time.

Still another object of the present invention is to provide a zoom lens amount which will permit the application of extenders without requiring that the zoom and focusing elements be disconnected.

A feature of the present invention is its use of a carriage to which the zoom lens is attached and which will permit the lens to slide away from the camera for the insertion of the extender.

Another feature of the present invention is its use of telescoping rods for interconnecting the mechanism of the zoom lens with control knobs and handles.

A further feature of the present invention is its use of a rigid bracket assembly for maintaining the zoom lens in vibration free engagement with the television camera.

The invention consists of the construction, combination and arrangement of parts, as herein illustrated, described and claimed.

In the accompanying drawings, forming a part hereof, there is illustrated one form of embodiment of the invention, in which drawings similar reference characters designate corresponding parts, and in which:

FIGURE 4 is a view in side elevation partly broken away of a varifocal or zoom lens and lens carriage in accordance with the present invention.

FIGURE 5 is a view in front elevation taken on line 5—5 of FIGURE 4, looking in the direction of the arrows.

Figure 1:
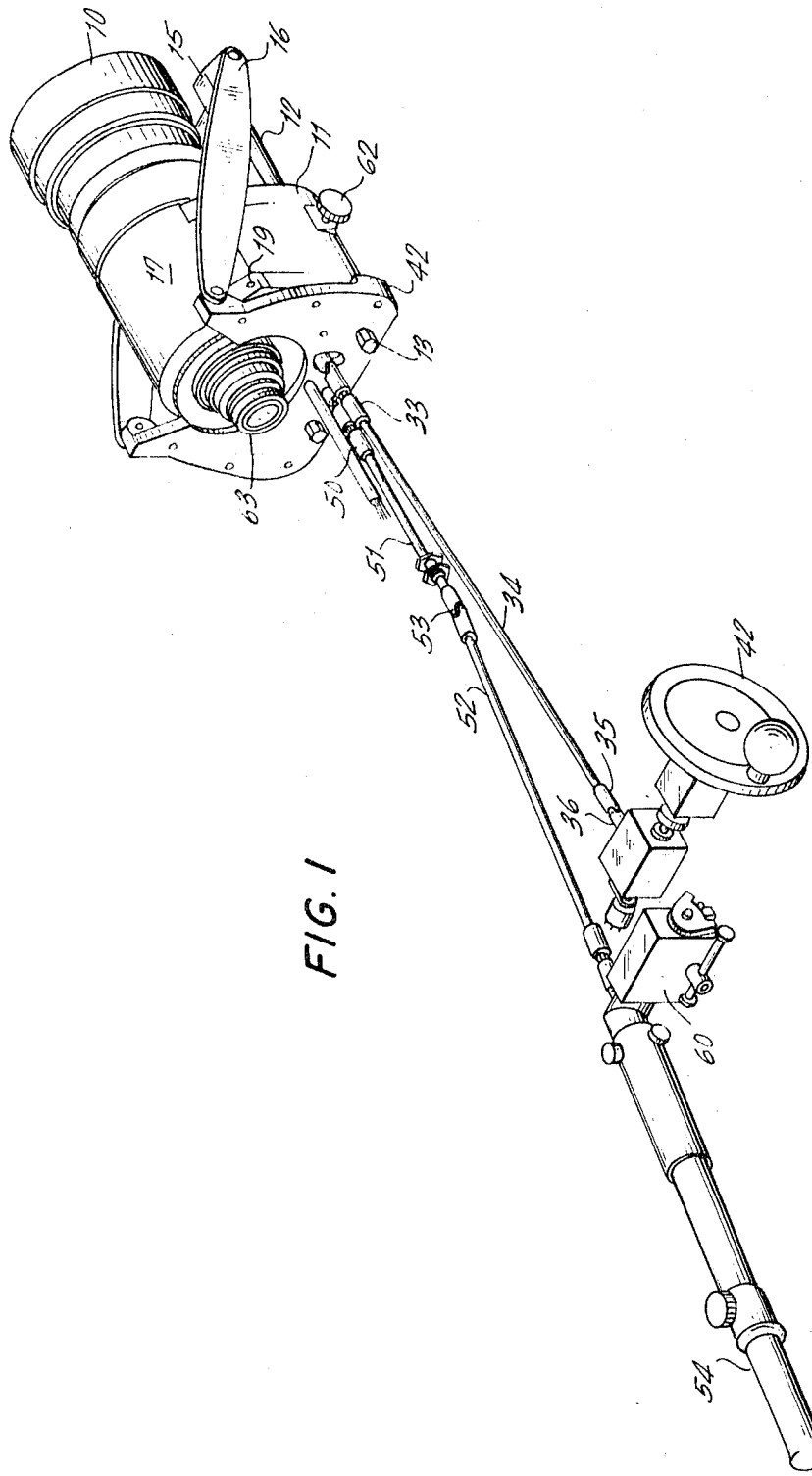
FIGURE 1 is a somewhat isometric view of a complete embodiment of a television camera lens control device made in accordance with the present invention.

Referring to the drawings and particularly to FIGURE 1, 10 indicates a varifocal or zoom lens of the mechanically or optically compensated type, such as is used in television cameras. The lens 10 is secured to a carriage 11, which in turn is slidably carried upon spaced rods 12. The rods 12 are secured at their inner ends to a plate 14, and at their outer ends to a transverse bracket 15. A link 16 is secured at each side of the lens 10, to the top of the plate 14 at one end of the link and to the ends of the bracket 15 at the other end of the link. The rods 12 are thus supported rigidly and serve to maintain the lens in a vibration free location upon the camera.

A bearing shaped clamp 17 secures the lens 10 to the carriage 11 and is held in place by means of screws 19.

Figure 2:
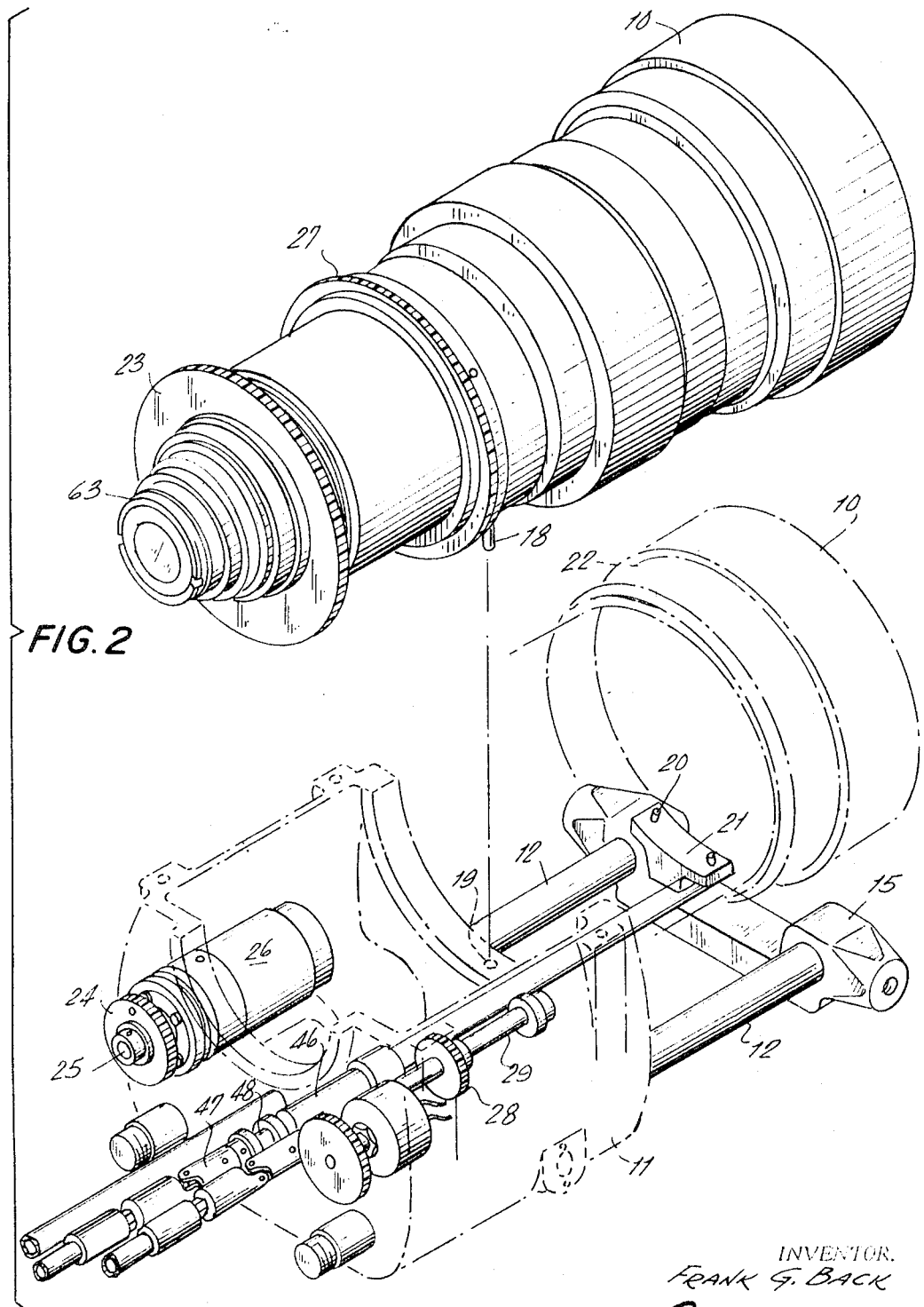
FIGURE 2 is a partially exploded isometric view of the varifocal lens and lens carriage shown in FIGURE 1.

Referring to FIGURE 2, it will be seen that the lens 10 is provided with a positioning pin 18 which is received within a bore 19 in the carriage 11. The lens 10 is thereby positively oriented upon the carriage 11 at all times. The lens 10 is also provided with spaced bores (not shown) at the front thereof to receive two detents 20 which extend upwardly from a lens focusing arm 21. The focusing arm 21 is thus coupled to the ring 22 of the zoom lens 10 which controls the focusing operation. The arm 21 is longitudinally slidable, in a manner hereinafter more fully set forth, for the purpose of bringing the lens in focus before operating the camera.

When the lens 10 is secured within the carriage 11, a geared flange 23 spaced from the exit end of the lens 10 is brought into mesh with a small spur gear 24. The spur gear 24 is secured to the shaft 25, of a small electric motor 26. The operator of the camera is thus able to control the iris of the lens 10 in a manner well known in the television art.

A geared ring 27 is secured to the barrel of the lens 10 and serves to operate the movement of the lens elements (not shown) within the lens 10 in order to effectuate the zoom action. The geared ring 27 is in mesh with a spur gear 28 which is pinned to the zoom control rod 29.

Figure 3:
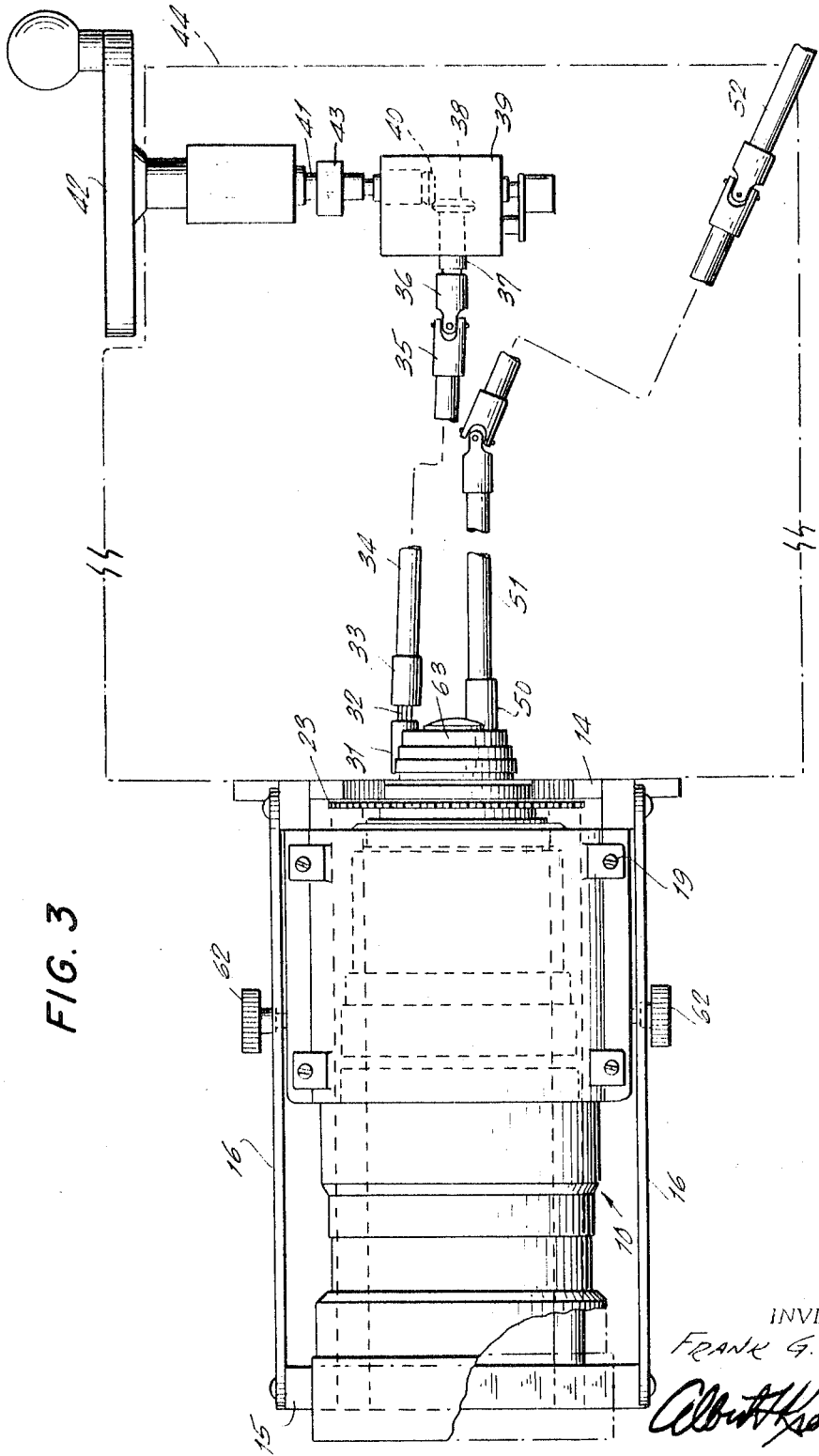
FIGURE 3 is a plan view partially broken away of a television camera lens control device according to the present invention with the television camera indicated in dashed lines.

Referring to FIGURE 4 it will be seen that the zoom control rod 29 is journaled within the carriage 11 at its forward end as indicated at 30, and provided with a universal coupling 31 at its opposite end. The universal coupling 31 has secured thereto an elongated hexagonal or noncircular rod 32 which is received within a sleeve 33. The sleeve 33 is provided with a bore which conforms to the cross-sectional shape of the rod 32 so that the rod may slide through the sleeve but will not rotate therein. An elongated tubular member 34 is secured to the sleeve 33 at one end, and to one-half of a universal coupling joint 35, at its opposite end (see FIGURES 1 and 3). The other half 36 of the coupling joint is secured to a small shaft 37 which is provided with a beveled gear 38 at the end thereof. The bevel gear 38 is carried within a gear box 39 and is in mesh with a second bevel gear 40 within the said gear box 39. The gear 40 is secured to a shaft 41 which has a disc shaped control wheel 42 on the end thereof. The shaft 41 is supported by a bearing 43 carried within the camera, (indicated by the dashed lines 44).

It will be apparent from the foregoing that as the control wheel 42 is rotated in a clockwise or counterclockwise direction, rotary motion will be imparted to gears in the gear box 39, to the tubular member 34 and thence to the hexagonal rod 32 which drives the spur gear 28 and actuates the motion of the lens elements within the varifocal lens 10 to bring about the zooming action. The operation is positive and virtually frictionless and without backlash or slippage.

The focusing arm 21 is provided with an external thread 45, at the inner end thereof. The thread 45 is coarse so as to provide a substantial travel of the focusing arm 21 when an elongated internally threaded nut 46 within which the arm 21 is received, is rotated.

Figure 6:
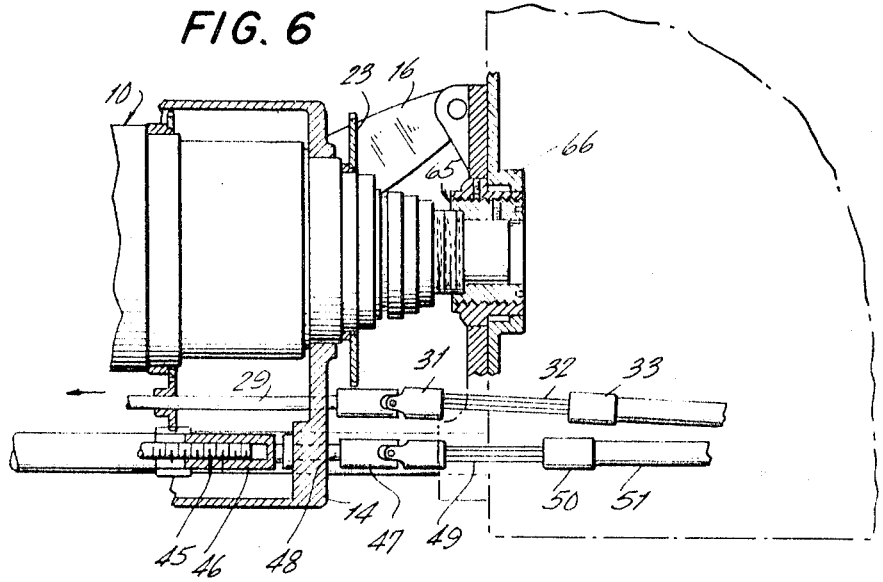
FIGURE 6 is a fragmentary view in side elevation of the exit end of a varifocal lens showing a lens extender in place.

As shown in FIGURE 6, the nut 46 is secured to a universal coupling 47 by means of a small shaft 48. The coupling 47 in turn, has a hexagonal or noncircular rod 49, attached thereto. The rod 49 is slidably received within a sleeve 50 having a non-circular bore which conforms in cross-sectional shape to that of the rod 49, and a tubular member 51.

As shown in FIGURE 1 the tubular member 51 is coupled to a second tubular member 52 by means of a universal coupling 53. In this manner rotational force can be applied to the tubular members even though the focusing control handle 54 is somewhat offset with respect to the longitudinal axis of the lens focusing arm 21. The offset position of the control handle 54 is necessary in order to get around operating portions of the intervening camera 44.

Figure 8:
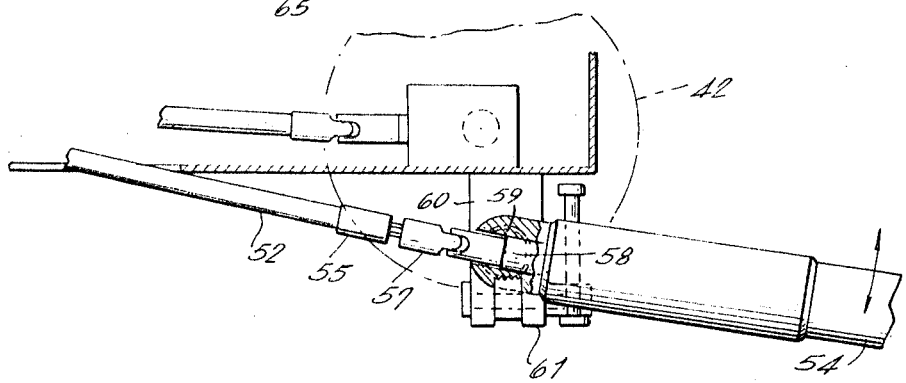
FIGURE 8 is a fragmentary view in side elevation of the zoom and focus control portion of the present invention.

The manner in which the tubular members 51, 52, are connected to the focusing control handle 54 is best shown in FIGURE 8, from which it may be observed that the tubular member 52 is provided with a sleeve 55 at the handle end thereof. The sleeve 55 is adapted to receive a hexagonal rod 56 which is in turn secured to a universal coupling member 57. A shaft 58 which interconnects the focusing control handle 54 and the coupling 57 is journaled within a small cylinder 59 which in turn is rotatably carried within a mounting block 60. The mounting block 60 is secured to the camera and a small clamping device 61 is provided in the mounting block for holding the cylinder 59 in any set position. In this manner, the control handle 54 can be adjusted to any desired height or position and thereafter locked in place.

In adjusting the control handle 54 the hexagonal rod 56 slides in or out of the sleeve 55 without disturbing the driving relationship of the parts.

It will be apparent from the foregoing that rotational motion imparted to the focusing handle 54 will be transmitted along the tubular members 52, 51, the hexagonal rods 56 and 49, up to the nut 46. As the nut is rotated the lens focusing arm 21 will be moved forward or back depending upon the direction of rotation of the nut, to operate the focusing elements of the lens 10.

In the operation of a television camera it is often desirable to change the range of the zoom lens in order to accommodate the type of scene being televised. The range of the zoom lens is changed by interposing one or more auxiliary lenses between the zoom lens assembly and the television camera. These lenses are hereinafter referred to as extenders.

Referring again to FIGURES 1 and 2, it will be observed that the zoom lens 10 is secured to a carriage 11, slidably carried upon spaced rods 12. A locking screw is provided on the carriage 11 to hold it in an adjusted position upon the rod 12. When it is desired to insert a range extender between the zoom lens 10 and the camera 44, the locking screw 62 is loosened and the entire assembly of zoom lens 10 and carriage 11 is slid away from the camera along the rods 12. The rods 12 are of a length which will provide ample space between the end of the lens 10 and the camera 44. The end of the lens 10 is threaded as indicated at 63, to receive thereon the barrel 64 of the lens extender. One or more lenses 65 are carried within the barrel 64 to provide the necessary correction of the light rays exiting from the lens 10.

FIGURE 6 shows a lens extender 65 threaded to the exit end of the zoom lens 10 and pushed back against the housing 66 in position for camera operation. It will be observed from an examination of FIGURE 6 that the rods 32, 49, which serve to drive the couplings 31, 47, have been partially pulled out of sleeves 33, 50. In this manner, the coupling between the drive wheel 42 and control handle 54 and the lens 10 is not disconnected despite the fact that the lens 10 has been slid away from the camera 44 and thereafter moved back into operating position.

Figure 7:
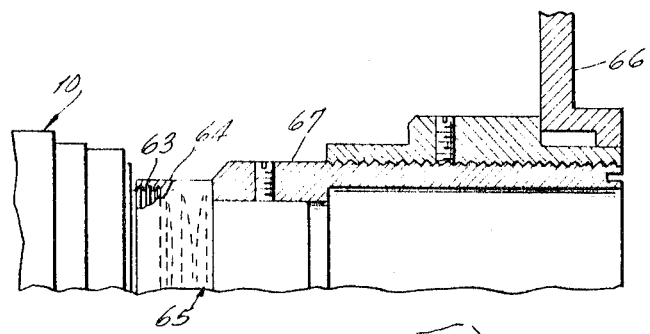
FIGURE 7 is a fragmentary view in side elevation and partly in section on a somewhat enlarged scale showing a second lens extender in place.

In FIGURE 7 there is shown still another lens extender in which the barrel 67 is longer than that shown in FIGURE 6 so as to provide a longer focal length for the lens 10. It will be seen that the barrel 67 when moved into the operating position shown in FIGURE 7, forms a light tight union with the housing 66 of the camera 44.

In order to remove the lens extender it is merely necessary to loosen the locking screw 62, slide the carriage 11 away from the camera housing 66, unscrew the extender barrel and thereafter slide the lens 10 back against the housing 66 until it is in the position shown in FIGURE 4. The locking screw 62 is tightened to insure that the lens 10 will remain in its proper position.

From the foregoing it will be seen that there has been provided a television camera lens control device which lends itself to easy adjustment and handling, and which will not require major disassembling and assembling when the various changes are made which are necessary during the normal use of such cameras.

While, for the purpose of illustration, the varifocal lens 10 has been shown as having a slidable front barrel for focusing purposes and a rotatable barrel for moving the lens elements of the varifocal lens system, it will be apparent that focusing can be achieved by means of a rotatable barrel and zooming can be accomplished by means of a sliding barrel as is well known in the art. Accordingly, the present invention is not to be limited to the specific mechanical lens arrangement shown but can be applied to any of the well known zoom lenses without regard to the manner in which the barrels are moved for focusing and zooming purposes.

Having thus fully described the invention, what is claimed as new and desired to be secured by Letters Patent of the United States, is:

1. A television camera lens control device for a varifocal lens system having a first movable barrel for focusing and a second movable barrel for driving the movable lens elements comprising: an upstanding plate for attachment to a television camera, spaced rods secured to the plate at one end and extending outwardly thereof, a carriage slidably carried upon the rods to receive the varifocal lens thereon, whereby the lens can be shifted into and out of operative position with respect to the camera without removal from the said carriage, a first rotatable elongated rod means drivably connected at one end to the first lens barrel, a control handle drivably coupled to the opposite end of said first rod whereby the first rod may be rotated to move the first barrel, a second elongated rod means drivably connected at one end to the second barrel, a control wheel drivably connected to the other end of the second rod whereby the second barrel may be operated, said first and second rod means comprising a plurality of rods telescopically received within elongated tubes, and means to lock the carriage to hold the lens system in an operative position upon the camera.

2. A device according to claim 1 in which the second rod means comprises a control rod, gear means on said control rod in driving engagement with the second lens barrel, a first universal coupling connected to the control rod, a noncircular rod connected at one end of a first universal coupling and extending outwardly therefrom, a sleeve having a noncircular bore to freely receive the noncircular rod, an elongated tubular member secured at one end to the sleeve and adapted to receive the noncircular rod therein, a second universal coupling secured at the opposite end of the tubular member and gear means interconnecting the control wheel and the second universal coupling.

3. A device according to claim 1 in which the second rod means comprises a control rod, gear means on said control rod in driving engagement with the second lens barrel, a first universal coupling connected to the control rod, a noncircular rod connected at one end of the first universal coupling and extending outwardly therefrom, a sleeve having a noncircular bore to freely receive the noncircular rod, an elongated tubular member secured at one end to the sleeve and adapted to receive the noncircular rod therein, a second universal coupling secured at the opposite end of the tubular member and gear means interconnecting the control wheel and the second universal coupling, and the first rod means comprises a lens focusing arm, secured at one end to the first barrel, an external thread on the opposite end of the focusing arm, a nut threadedly received upon the external thread, a third universal coupling fastened to the end of the nut, a noncircular rod pinned to the third universal coupling and extending outwardly thereof, a second sleeve having a noncircular bore to freely receive the noncircular rod, an elongated second tubular member secured at one end to the sleeve and adapted to receive the noncircular rod therein, a fourth universal coupling secured to the other end of the tubular member, a third tubular member secured to the fourth coupling, a second sleeve having a noncircular bore therein, on the third member, a second noncircular rod slidably received within the sleeve and tubular member, a fifth universal coupling secured at one end to the noncircular rod, and a control handle coupled to the fifth universal coupling imparting rotary motion to the said second rod means.

4. A device according to claim 3 in which the control handle is swingably carried within a cylindrical block and means to lock the said block in a selected position.

References Cited
UNITED STATES PATENTS

| | | | |
|---|---|---|---|
| 1,399,396 | 12/1921 | Nelson | 355—55 |
| 2,532,684 | 12/1950 | Walker | 350—186 |
| 2,732,763 | 1/1956 | Back | 350—186 |
| 2,984,154 | 5/1961 | Walker | 350—186 |
| 3,405,991 | 10/1958 | Seedhouse | 350—44 |
| 2,729,154 | 1/1956 | De Grave | 95—45 |
| 2,746,350 | 5/1956 | Hopkins. | |
| 3,158,076 | 11/1964 | Back | 95—45 |
| 3,250,197 | 5/1966 | Fladlien | 95—45 |

FOREIGN PATENTS 1,099,210  2/1961  Germany.

ROBERT L. GRIFFIN, Primary Examiner

J. A. ORSINO, Jr., Assistant Examiner

U.S. Cl. X.R.

95—45; 350—38, 184, 186